(12) United States Patent
Angelsen et al.

(10) Patent No.: US 7,727,156 B2
(45) Date of Patent: Jun. 1, 2010

(54) DUAL FREQUENCY BAND ULTRASOUND TRANSDUCER ARRAYS

(76) Inventors: Bjørn A. J. Angelsen, Bugges veg 4B, Trondheim (NO) N7051; Tonni F. Johansen, Nil Uhlin Hansens veg 50C, Trondheim (NO) N7026; Rune Hansen, Kaarli, Stadsbygd (NO) N7105; Svein-Erik Maasoey, Nordre gt 8, Trondheim (NO) N7011; Peter Näsholm, Herman Krags v 3-21, Trondheim (NO) N7050

( * ) Notice: Subject to any disclaimer, the term of this patent is extended or adjusted under 35 U.S.C. 154(b) by 0 days.

(21) Appl. No.: 11/493,283

(22) Filed: Jul. 26, 2006

(65) Prior Publication Data

US 2007/0035204 A1    Feb. 15, 2007

Related U.S. Application Data

(60) Provisional application No. 60/702,423, filed on Jul. 26, 2005.

(51) Int. Cl.
*A61B 8/00* (2006.01)
*H01L 41/00* (2006.01)
*H04R 19/00* (2006.01)

(52) U.S. Cl. .................. 600/459; 310/311; 310/327; 367/174; 367/181

(58) Field of Classification Search ................. 600/437, 600/446, 443, 441, 439; 601/2; 367/140; 310/311

See application file for complete search history.

(56) References Cited

U.S. PATENT DOCUMENTS

| 4,915,115 | A | * | 4/1990 | Sasaki et al. ................. 600/441 |
| 5,400,788 | A | * | 3/1995 | Dias et al. .................... 600/459 |
| 5,410,516 | A | | 4/1995 | Uhlendorf et al. |
| 5,497,540 | A | * | 3/1996 | Venkataramani et al. ... 29/25.35 |
| 5,908,389 | A | * | 6/1999 | Roundhill et al. ........... 600/443 |
| 6,312,383 | B1 | | 11/2001 | Lizzi et al. |
| 6,461,303 | B2 | | 10/2002 | Angelsen |

(Continued)

FOREIGN PATENT DOCUMENTS

JP        2251754       10/1990

(Continued)

OTHER PUBLICATIONS

Br Heart 1984 51: Doppler echocardiography in the study of patients with mitral disc valve prostheses pp. 61-69.

(Continued)

*Primary Examiner*—Eric F Winakur
*Assistant Examiner*—Lawrence N Laryea
(74) *Attorney, Agent, or Firm*—Cohen Pontani Lieberman & Pavane LLP

(57) ABSTRACT

Ultrasound probes that transmits/receives ultrasound pulses with frequencies both in a low frequency (LF) and a high frequency (HF) band, where the radiation surfaces of said HF and LF bands at least have a common region. Several solutions for transmission (and reception) of LF and HF pulses through the same radiation surface are given. The arrays and elements can be of a general type, for example linear phased or switched arrays, or annular arrays or elements with division in both azimuth and elevation direction, like a 1.5D, a 1.75D and a full 2D array. The LF and HF element division and array apertures can also be different.

33 Claims, 11 Drawing Sheets

U.S. PATENT DOCUMENTS

| | | |
|---|---|---|
| 6,598,601 B2 | 7/2003 | Schutz |
| 6,673,016 B1 * | 1/2004 | Bolorforosh et al. ........ 600/437 |
| 2002/0042572 A1 * | 4/2002 | Fukukita ..................... 600/443 |
| 2003/0155290 A1 | 8/2003 | Chanaud |
| 2004/0012307 A1 | 1/2004 | Fukuda et al. |
| 2004/0267130 A1 | 12/2004 | Angelsen et al. |
| 2005/0203397 A1 * | 9/2005 | Degertekin ................. 600/437 |
| 2005/0240127 A1 * | 10/2005 | Seip et al. ....................... 601/2 |
| 2006/0173321 A1 * | 8/2006 | Kubota et al. ............... 600/439 |

FOREIGN PATENT DOCUMENTS

| | | |
|---|---|---|
| JP | 4273699 | 9/1992 |
| JP | 5277102 | 10/1993 |
| JP | 2002336248 | 11/2002 |
| JP | 2005103193 | 4/2005 |
| WO | WO 2004/007098 | 1/2004 |
| WO | WO 2005/120355 | 12/2005 |

OTHER PUBLICATIONS

2004 IEEE Ultrasonics Symposium: Prototype Dual Frequency Bilaminar Array Transducer Capable of Therapeutic Exposure at 500 kHz and Doppler Monitoring at 2MHz pp. 141-144.

2003 IEEE Ultrasonics Symposium: Dual Frequency Array Transducer for Ultrasonid-Enhanced Transcranial Thrombolysis pp. 680-683.

2004 IEEE Ultrasonics Symposium: CMUTs with Dual Electrode Structure for Improved Transmit and Receive Performance pp. 501-504.

International Search Report dated May 29, 2007 issued in corresponding application No. PCT/2006/000285.

* cited by examiner

US 7,727,156 B2

DUAL FREQUENCY BAND ULTRASOUND TRANSDUCER ARRAYS

CROSS REFERENCE TO RELATED APPLICATION

This application claims priority from U.S. Provisional Patent Application Ser. No. 60/702,423 which was filed on Jul. 26, 2005.

BACKGROUND OF THE INVENTION

1. Field of the Invention

The present invention is directed to technology and designs of efficient acoustic (sonic and ultrasonic) bulk wave transducers for simultaneous operation in at least two frequency bands. Applications of the transducers are for example, but not limited to: medical ultrasound imaging, nondestructive testing, industrial and biological inspections, geological applications, and SONAR applications.

2. Description of the Related Art

The utilization of the nonlinear elasticity of tissue and ultrasound contrast agent micro-bubbles in medical ultrasound imaging provides improved images with less noise. The widest use is in the so-called harmonic imaging, where the $2^{nd}$ harmonic component of the transmitted frequency band is used for the imaging. A use of $3^{rd}$ and $4^{th}$ harmonic components of the transmitted pulse for imaging is also presented in U.S. Pat. No. 6,461,303.

Dual band transmitted pulses were used in M-mode and Doppler measurements in Br Heart J. 1984 Jan;51(1):61-9. Further examples are shown in U.S. Pat. No. 5,410,516 where sum and difference bands of the transmitted bands produced in the nonlinear scattering from contrast agent micro-bubbles where detected. A further development of this dual band transmission is done in U.S. Pat. No. 6,312,383 and U.S. patent application Ser. No. 10/864,992.

U.S. patent application Ser. Nos. 10/189,350 and 10/204,350 describe in depth different uses of dual band transmitted ultrasound and acoustic pulse complexes that provide images with reduced noise, images of nonlinear scattering, and quantitative object parameters that greatly enhance the use of ultrasound and acoustic imaging. The methods are applicable both with transmission and back scatter imaging. For these applications one would transmit dual band pulse complexes as illustrated by example in FIG. 1, where in FIG. 1a a high frequency (HF) pulse 101 rides on the peak pressure of a low frequency (LF) pulse 102. FIG. 1b shows another situation where the HF pulse 103 rides on the maximal gradient of the LF pulse 102. The ratios of the center frequencies of the LF and HF pulses can typically be in the range of 1:5-1:20, and at the same time the HF pulse must be found in defined intervals of the LF pulse throughout defined depth ranges of the images. These requirements provide the following two challenges for the design of the transducer arrays:

1. For the HF pulse to propagate within a range interval of the LF pulse throughout a depth range of the image, the HF and LF radiation surfaces must have a large common area. One generally wants pulse pressures in the HF and the LF pulses in the order of MPa, depending on the application. This requires high electro to acoustic transfer efficiency which with current transducer technology is obtained with resonant operation of the transduction, which in turn gives a limited operative frequency band of current ultrasound transducer arrays, which do not cover the required frequency band (typically 1:5-1:15) for the described applications. Because one needs a large part of the HF and LF radiation surfaces to be common, this wide band presents special challenges for the structural vibration design of the arrays.

2. The large frequency separation between the HF and the LF pulses means that the wave length of the LF pulses is much larger than the wave length of the HF pulses, typically by a factor 5-15, which means that the LF pulse beam is subject to much higher diffractive beam divergence than the HF pulse beam. For adequate collimation of the LF beam to maintain high LF pressures at large depths, one therefore in certain applications needs to use larger width of the LF aperture than the HF aperture. This produces a sliding of the position of the HF pulse relative to the LF pulse with propagation distance, which sets special requirements for the design of the dual frequency radiation surfaces.

In another application one wants from the same probe to transmit a low frequency (e.g. 0.5-2 MHz) wave for treatment (hyperthermia or cavitation destruction of tissue), while being able to provide ultrasound imaging from the same probe surface at a higher frequency (e.g. 5-10 MHz). In yet other applications one simply wants to have a larger frequency band available for imaging from the same probe at a large variation of depth ranges.

The current invention presents several solutions to these challenges of transducer designs that can transmit/receive dual band ultrasound pulse complexes with large separation between the low and high frequencies, and with limited position/phase sliding between the transmitted HF and LF pulses with depth. We are in this invention mainly concerned with a situation where one transmits a LF/HF pulse complex with reception in the HF band only, but it is clear due to reciprocity that the probes also can be used to receive the LF band.

SUMMARY OF THE INVENTION

The invention presents solutions to the general need for an ultrasound probe that transmits/receives ultrasound pulses with frequencies in widely separated low frequency (LF) and a high frequency (HF) bands through a at least partially common radiation surface, so that the LF and HF beam pulses overlap in front of the probe with defined phase relationships.

In one embodiment according to the invention, the LF and HF pulses are generated with separate piezoelectric layers stacked on top of each other with the HF piezolayer in the front and an isolation section between said HF and LF piezolayers, said isolation section being composed of at least two acoustic layers. The backlayer of the isolation section is preferably a heavy material, for example Cu, Ag, Au, Pd, Pt, W, or alloys of such materials, or mixtures of powders of such materials or their alloys sintered together or glued in a solvent such as a polymer. The invention also presents a solution where the back layer of the isolation section is ceramics, part of the LF piezolayer. This ceramics back layer is conveniently combined with a thin layer (the order of $\lambda/20$) of heavy material like Cu, Ag, Au, Pd, Pt, W, or mixtures of powders of such materials and a polymer.

In another embodiment according to the invention, one of the LF and HF pulses are generated with vibrating membranes on a substrate activated by cmut/pmut technology, while the other of the LF and HF pulses are generated with a piezolayer. In yet another embodiment according to the invention, both the LF and the HF pulses are generated with cmut/pmut membranes on a common substrate, either side by side of each other or the HF membranes on top of the LF membranes.

The invention can also be used with sparse arrays, where the grating lobes from the HF aperture should be different from possible grating lobes of the LF aperture, to suppress the effect of transmitted HF grating lobes for example with imaging technology according to U.S. patent application Ser. Nos. 10/189,350 and 10/204,350.

The arrays can be of a general nature, for example linear phased or switched arrays, or annular arrays. Element divisions of the linear arrays in the elevation direction to for example a 1.5 D, a 1.75 D and even a full 2 D array are also within the scope of the invention. One can further have different element divisions of the HF and LF arrays. The invention also prescribes an instrument using an ultrasound dual frequency probe according to the invention, and where at least the radiation region of the LF aperture can be selectably varied to be one of equal to the HF transmit aperture, larger than the HF aperture where the HF radiation area is part of the LF radiation area, or the HF radiation area can contain a central region without LF radiation. The LF transmit aperture can be selected automatically by the instrument depending on the image depth and imaging modality, or manually by the instrument operator from the instrument control panel.

We are in this invention mainly concerned with the transmission of dual band pulse complexes, where it is clear to anyone skilled in the art that the arrays can and will be used for reception of ultrasound pulses both in the LF and HF bands. The methods cited in U.S. patent application Ser. Nos. 10/189,350 and 10/204,350 would receive the back scattered HF pulse only, where it is natural that the HF array is arranged so that one can use a dynamically expanding receive aperture with depth according to known methods, where the HF receive aperture for large depths typically can be equal to or larger than the LF transmit aperture.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1A:
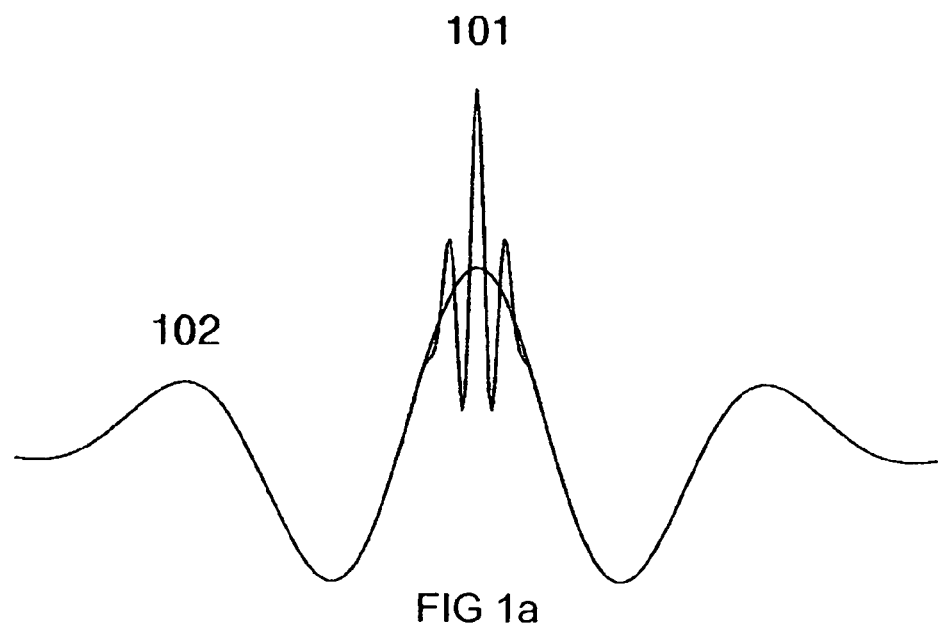
FIG. 1 shows examples of low frequency (LF) and high frequency (HF) pulse complexes that there is a need to transmit.
Figure 1B:
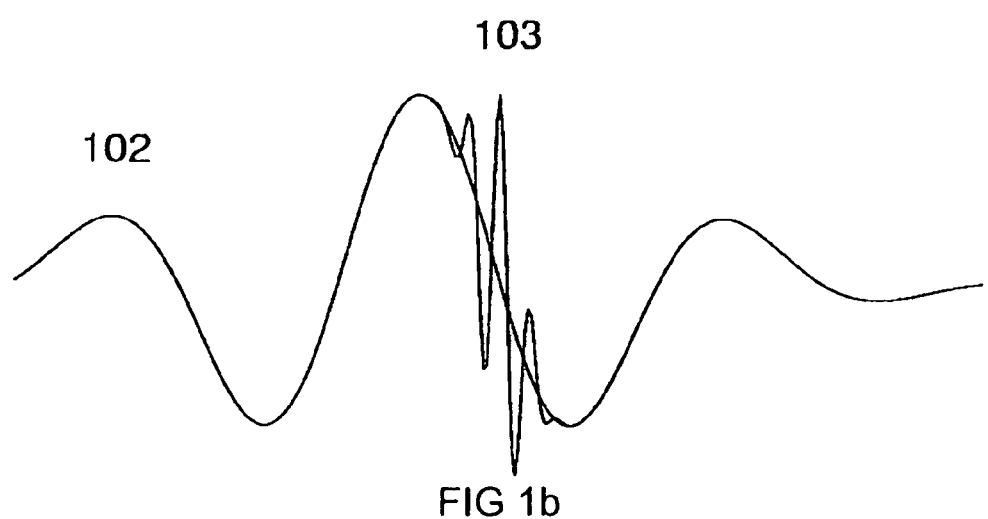

Example embodiments of the invention will now be described in relation to the drawings. Typical examples of dual frequency pulses that one wants to transmit are shown in FIG. 1 as described above. The challenges in the design of the arrays lie both in the design of the radiation surfaces so that the HF pulse is kept within desired location of the LF pulse for the image range while maintaining adequate amplitude of the LF pulse, and in design of a vibration structure that allows transmission of LF and HF pulses with such wide separation between the frequencies from the same surface.

In some of the applications it is important that the amplitude of the LF pulse at the location of the HF pulse is as high and close to constant as possible throughout the whole imaging range. This requires large apertures of the LF radiation surface to avoid diffraction spread of the LF beam due to the long wave length of the LF pulse compared to the HF pulse. The width of the HF transmission aperture can be limited by a requirement on the length of the HF transmit focal region. This gives a situation where one would prefer a larger LF aperture than the HF aperture, which introduces a sliding between the position of the HF pulse relative to the LF pulse.

Figure 2:
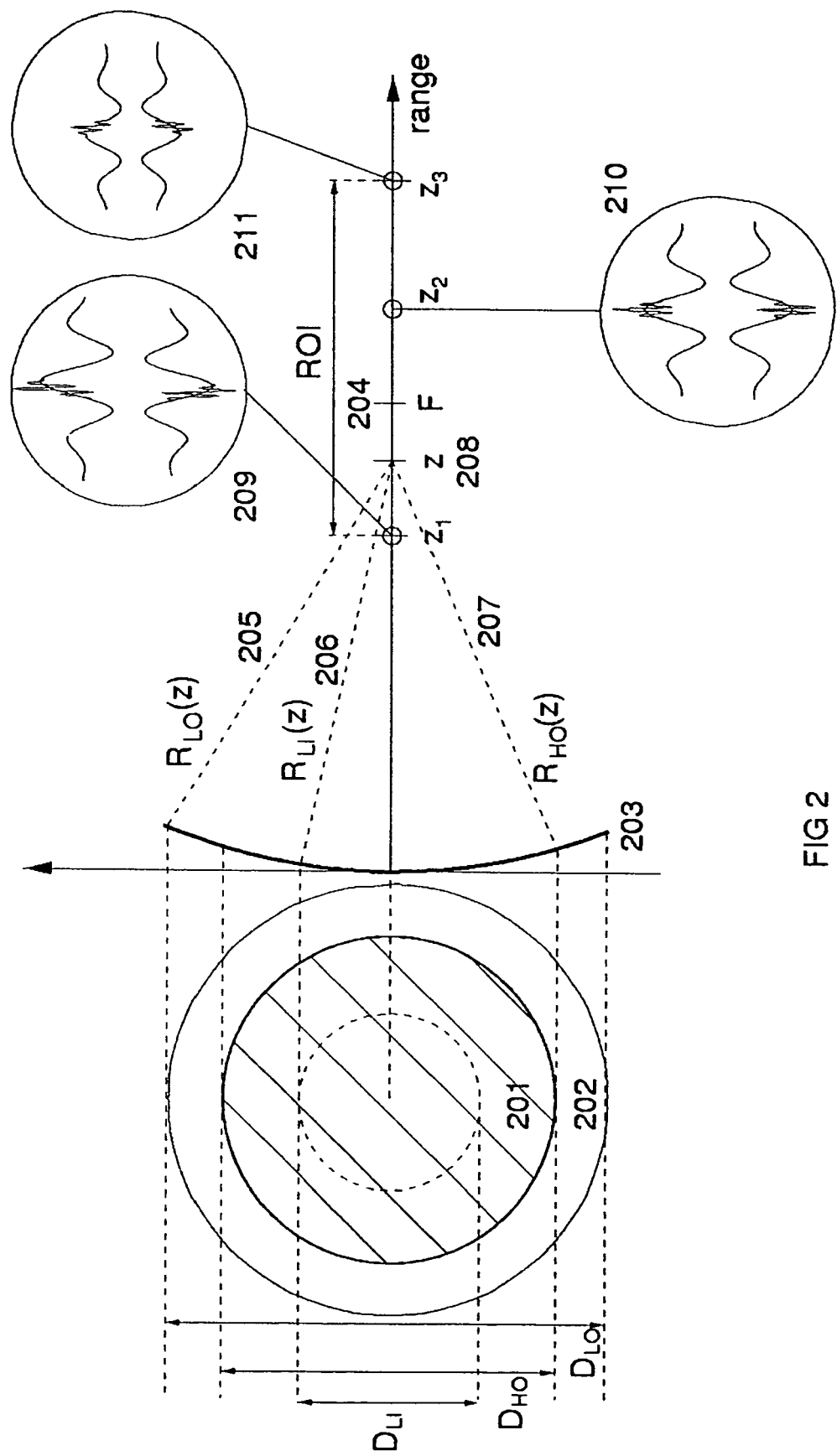
FIG. 2 shows example annular LF and HF radiation surfaces according to the invention, and also for analysis of LF and HF pulse phase relationships.

For further analysis of this sliding phenomenon we consider circular apertures because one have analytic expressions of the field on the axis of such apertures. FIG. 2 shows by way of example a circular HF transmit aperture 201 with diameter DHO and a concentric LF transmit aperture 202 which for the example is shown as a ring with outer diameter DLO and inner diameter DLI. A cross section diagram shows the HF and LF transmit apertures as 203, where they by way of example are curved to the same focus F, 204. The transmitted axial continuous wave field for the LF and the HF apertures at a frequency ω is as a function of the axial distance z given as $$P_{LF}(z;\omega) = \quad (1)$$

$$H_{LF}(z;\omega)P_{L0} = i2e^{-ik(R_{LO}(z)+R_{LI}(z))/2}\frac{\sin k(R_{LO}(z)-R_{LI}(z))/2}{F-z}FP_{L0}$$

$$k = \frac{\omega}{c}$$

$$P_{HF}(z;\omega) =$$

$$H_{HF}(z;\omega)P_{H0} = i2e^{-ik(R_{HO}(z)+z)/2}\frac{\sin k(R_{HO}(z)-z)/2}{F-z}FP_{H0}$$

where Ω is the angular frequency of the transmitted pulse and c is the ultrasound propagation velocity. $R_{LO}(z)$ shown as 205 is the distance from the outer edge of the LF aperture to the point z (208) on the z-axis, $R_{LI}(z)$ shown as 206 is the distance from the inner edge of the LF aperture to 208 on the z-axis, and $R_{HO}(z)$ shown as 207 is the distance from the outer edge of the HF aperture to 208 on the z-axis. $P_{LO}$ is the LF transmit pressure at the aperture while $P_{HO}$ is the HF transmit pressure at the aperture. The phase terms represent the average propagation lag from the LF and HF apertures, respectively as $$\tau_{LF}(z) = \frac{1}{2c}(R_{LO}(z) + R_{LI}(z)) \quad \tau_{HF}(z) = \frac{1}{2c}(R_{HO}(z) + z) \quad (2)$$

We hence see that when the boundaries of the HF and LF transmit apertures are different, the HF and LF pulses will get z-dependent propagation delays that differ from each other, and the location of the HF pulse relative to the LF pulse will slide with depth as illustrated in 209-211 for depths z1, z2 and z3. Albeit the above formulas are developed for circular apertures they illustrate a general principle for apertures of any shape, because the radiated beam originates as interference between spherical waves with origin at all points on the aperture (Huygen's principle). Hence, the waves originating from points on the LF aperture outside the HF aperture, will have longer propagation distance to the axis than points on the HF aperture. The difference between these propagation distances varies with depth z, which hence is responsible for the position sliding between the HF and the LF pulse.

We see that when the LF and HF transmit apertures are equal, there is no sliding between the LF and HF pulses, but as stated above, this can in many situations limit the LF transmit aperture so that too high beam divergence due to diffraction is found. Therefore it is often desirable to have a wider LF transmit aperture than the HF transmit aperture. This produces some sliding between the HF and LF pulses with depth, which can be established between tolerable limits through the dimensioning of the transmit apertures. This sliding can also be utilized for different purposes, for example to compensate for variations in the LF pulse amplitude so that the observed LF pressure at the location of the HF pulse has less variation with depth than the LF pulse amplitude.

Hence, different measurement situations put different requirements on tolerable variations of the LF amplitude and also position sliding between the HF and the LF pulses, and one therefore often wants at least the LF transmit aperture to be composed of elements so that the effective width of the LF transmit aperture can be selected together with the relative transmit timing of the HF and LF pulses so that in the desired range one gets best possible amplitudes and relative locations of the two pulses. The invention devices an ultrasound instrument using such a probe, where the selection of the active LF transmit aperture surface can be done automatically by the instrument depending on the application (e.g. suppression of multiple scattering noise or detection of contrast agent micro bubbles) and image depth, or manually by the instrument operator. One also wants to vary the HF transmit aperture, and during reception of the scattered HF signal one typically wants a receive aperture that increases dynamically with the focus to follow the scatterer depth. Hence, a preferred solution is a combined LF and HF array with common radiation surfaces, but where the actual LF and HF transmit apertures can be selected for the application, where the LF transmit aperture is typically larger than the HF transmit aperture, while the HF receive aperture can be selected as wide as or possibly wider than the LF transmit aperture at large depths, for example with dynamic receive aperture with depth.

In the above example, the LF and HF transmit amplitudes have common foci, which in most situations is an advantage, but differences in LF and HF transmit foci can also be utilized in the beam designs for different purposes. By dividing the apertures into array elements, one can electronically steer the focal depths of both the LF and HF apertures, and also the beam directions, according to known methods, as for example discussed in relation to FIG. 5 below.

Figure 3A:
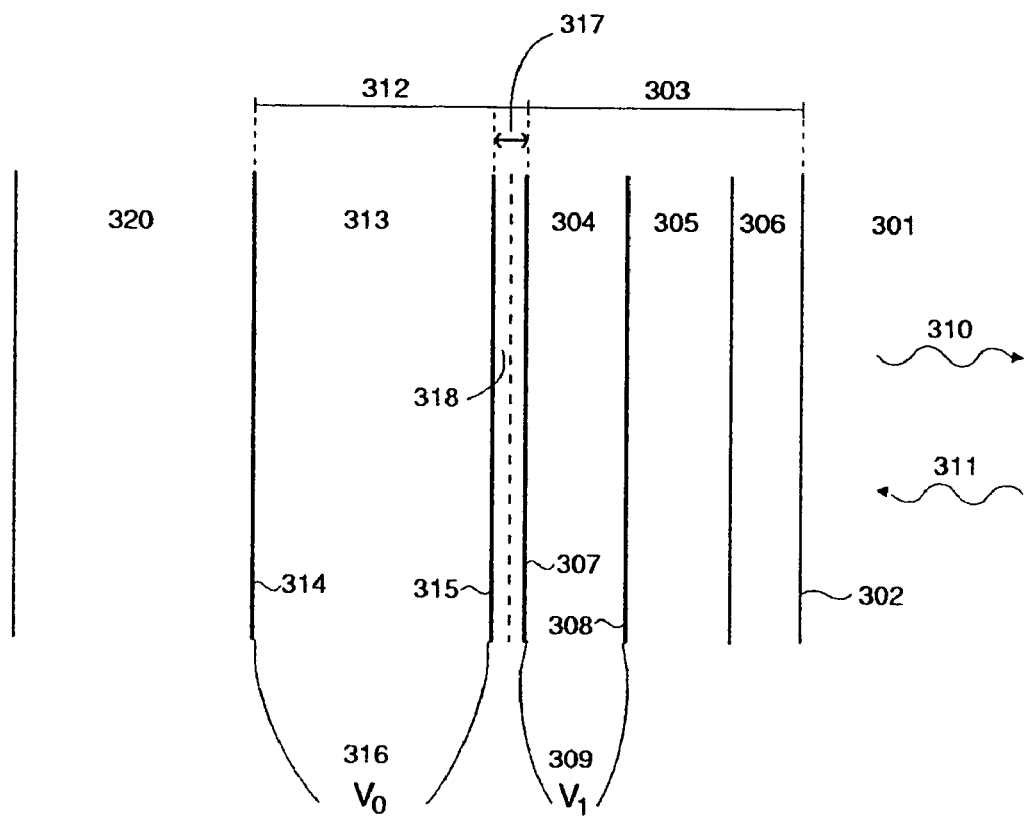
FIG. 3 shows a cross section of a LF and a HF piezolayer stack arrangement according to the invention that allows transmission and reception of a high and a low frequency pulse through a common front face.

The common radiation surfaces provide challenges in the structural design of electro/acoustic transduction due to the wide separation between the LF and HF frequency bands, where the current invention provides several solutions to this problem. A first example of a stack of piezoelectric and acoustic layers that allows transmission of a LF and a HF pulse with widely separated frequencies from the same radiation surface, is shown in FIG. 3*a*. The Figure shows a cross section through a layered structure that radiates and receives both frequency bands through at least a common radiation surface 302 in contact with the acoustic load material 301. For typical applications both the LF and the HF components might in addition be transmitted or received across separate surfaces outside the common surface. However, for equal LF and HF transfer functions across the whole aperture, it is advantageous to use the same thickness stack across the whole aperture, and define the LF and HF apertures by the areas of the active element electrodes as discussed below.

The HF pulse is received and/or generated by the transducer array assembly 303 which in this example is composed of a piezoelectric layer 304 with two acoustic matching layers 305 and 306 in front that connect to the acoustic load material 301. The piezoelectric layer has a set of electrodes on the front and back faces that electrically define the array elements, where by example FIG. 3 shows the cross section of the electrodes 307 and 308 for one array element that generates the electric port 309 for that element. Driving the electric port 309 with a voltage signal V, in the HF band, will generate vibrations on the radiating surface 302 that generate a wave 310 propagating into the load material with frequencies in the high band. Similarly, an incoming wave 311 with frequencies in the high band will produce electrical voltage oscillations across the HF port 309.

The LF pulse is in this example embodiment generated by the transducer array assembly 312, which is composed of a piezoelectric layer 313 covered on the front with a layered section 317 for acoustic isolation of HF vibrations in the HF structure from the LF structure. This HF isolation section provides a high reflection coefficient from the HF assembly 303 towards the LF assembly 312 to avoid interference of the LF structure on resonances in the HF structure. Section 317 is composed of at least two acoustic layers, where a back layer or group of layers 318 of this section has a high acoustic impedance for the reasons described below. The whole transducer assembly is mounted on a backing material 320 with so high absorption that reflected waves in the backing material can be neglected. The backing impedance must be adequately high for proper effect of the isolation section 317 as described below.

The Figure also shows a cross section of the electrodes 314 and 315 for a particular LF array element. The electrodes constitute a LF electric port 316, where driving this port with an electric voltage signal $V_0$ in the LF band produces LF vibrations on the array front face 302 that radiates a wave 310 into the load material 301. In the LF band the thickness of section 317 is so low that it adequately transmits the LF vibrations. For many applications, one will use the LF array as a transmitter only, but it is clear to anyone skilled in the art that the assembly can also be used for reception of the LF waves when needed.

The piezoelectric layers are most often made of ferroelectric ceramics, or a composite of ferroelectric ceramics and polymer fill according to known methods. The ferroelectric ceramic becomes piezoelectric when electrically polarized. Elements in an ultrasound array can be defined through cuts in the piezolayer, and in the case of ceramic/polymer composites these cuts can coincide with cuts of the composite, where the electrodes are used to define the array elements. The element electrodes are often used to polarize the ceramic and then provide a double definition of the element dimensions.

The thickness of the HF piezolayer 304 is much lower than the thickness of the LF piezolayer 313 due to the wide separation of the HF and the LF frequencies. For this reason the cuts between elements or in the composite of the LF layer require a thicker saw blade than for the cuts in the HF layer. It is hence in the practical manufacturing situation difficult to control that the ceramic posts of the HF layer connects to ceramics or polymer fill in the LF piezolayer. To make the HF isolation properties of the matching section 317 have enough low sensitivity to a connection into LF ceramic or polymer fill, the invention devices that the back layer or group of layers 318 of the section 317 close to the LF piezolayer 313 to be made of heavy materials with high acoustic impedance, for example metals like Ag, Cu, Au, Pd, Pt, and W, or even a ceramic material as discussed below. Large shear stiffness of the layer(s) 318 will also help in reducing the sensitivity to connection of 317 into ceramic or polymer fill, but large shear stiffness of 318 would also introduce lateral vibration coupling between the LF elements, and hence the thickness of this layer should be limited, while still making the impedance seen from the front into the section 317 adequately insensitive to connection into ceramic or polymer fill on the back side. Thicknesses of layer(s) 318 less than $\lambda/20$ are found useful, as discussed below. Of the listed metals, Ag, Au, Pd, and Pt have the lowest shear stiffness and still a high mass density which makes the materials most efficient for reducing the sensitivity to connection into ceramic or polymer fill with lowest lateral coupling between the LF array elements. The other layers of the isolation section 317 are typically chosen with $\lambda/4$ thickness at the high frequency.

Figure 3B:
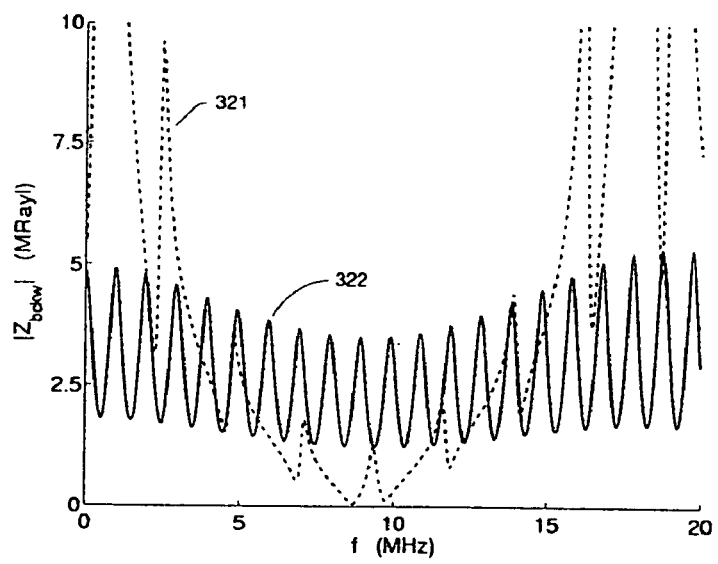
Figure 3C:
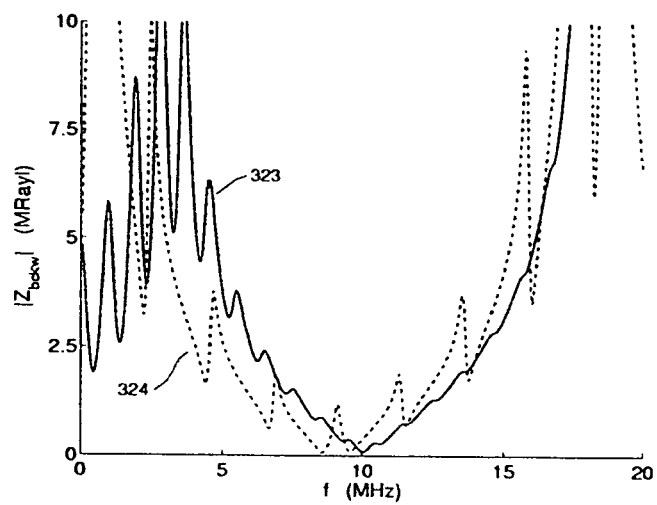
Figure 3D:
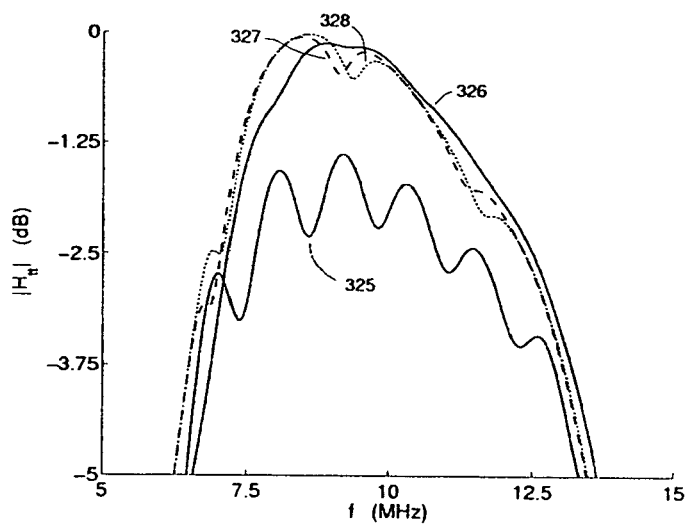
Figure 3E:
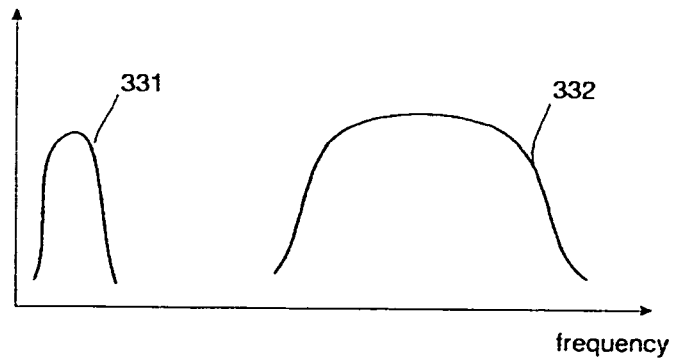

As an example of the effect of layers(s) 318 on the impedance seen into the section 317 from the front is shown in FIG. 3b-d. In FIG. 3b the isolation section 317 is composed of a single polymer layer that is $\lambda/4$ thick at 10 MHz. The curve 321 shows the impedance into 317 as a function of frequency when the layer connects to the ceramic on the back. The impedance into the ceramics of layer 313 oscillates between a low value of the backing impedance $Z_B$ when the ceramic is a whole number of $\lambda/2$ thick and a high value $(Z_{cer})^2/Z_B > Z_B$ when the ceramic is an uneven number of $\lambda/4$ thick. $Z_{cer}$ is the characteristic impedance of the ceramic. The $\lambda/4$ polymer layer 317 then transforms this impedance into oscillations with the frequency where close to 10 MHz we get a minimum value close to $(Z_{pol}/Z_{cer})^2*Z_B$ and peak values close to $Z_{pol}^2/Z_B$, where $Z_{pol}$ is the characteristic impedance of the $\lambda/4$ polymer layer. The curve 322 shows the impedance from the front into 317 as a function of frequency when the layer connects to the polymer fill between the LF ceramic posts. The impedance into the polymer fill in layer 313 oscillates between a high value of the backing impedance $Z_B$ when the fill is a whole number of $\lambda/2$ thick, and a low value $(Z_{fill})^2/Z_B < Z_B$ when the fill is an uneven number of $\lambda/4$ thick. $Z_{fill}$ is the characteristic impedance of the polymer fill between the ceramic posts in the ceramic/polymer composite of layer 313. The $\lambda/4$ polymer layer 317 then transforms this impedance into an oscillating variation where close to 10 MHz the peak values are close to $(Z_{pol}/Z_{fill})^2*Z_B$ and minimum values are close to $Z_{pol}^2/Z_B$.

FIG. 3c shows the impedance seen from the front into section 317 when a Cu layer 318 of 20 μm thickness (about $\lambda/25$ of Cu) is introduced on the backside of the $\lambda/4$ polymer layer described in FIG. 3b. The curve 323 shows the impedance seen from the front into the section 317 when the Cu layer is connected to the polymer fill between the LF ceramic posts. The Cu layer of this thickness gives an added inductive impedance of the mass load of the Cu seen into the fill, which increases the impedance seen from the $\lambda/4$ layer towards the back, and the $\lambda/4$ layer inverts this impedance into an impedance <2 MRayl in the band 7-13 MHz which gives a very good isolation from the HF to the LF section in this band. The curve 324 shows the impedance seen into section 317 when the section is connected to the LF ceramic posts. We note that the effect of the Cu layer makes less modification from the curve 324 from 321 than of the curve 323 from 322 when connecting to the polymer fill. The reason is that because the ceramic has a high characteristic impedance, the Cu layer mainly changes the frequencies of the low and the high impedance seen from the back of the $\lambda/4$ layer, and not so much the value of the low and the high impedance. However, by using a sufficiently high backing impedance, for example $Z_B$=5 MRayl in this example, the maximal impedances seen into the isolation section 317 when connected to ceramic is still below 2 MRayl in the 7-13 MHz band, which gives a high isolation seen from the HF section in this band.

The effect of the Cu layer on the HF electro-acoustic transfer function is shown in FIG. 3d. The curve 325 shows the HF transfer function when isolation section 317 is composed of a single $\lambda/4$ polymer layer as in FIG. 3b and connected to the polymer fill on the back. We note that this curve shows resonances due to internal HF reflections in the LF section 312 because the impedance curve 322 do not provide adequate reflection at the back of the HF piezolayer 304. Introducing a layer 318 of 20 μm Cu changes this transfer function to curve 326 where the resonances due to reflections in the LF section have disappeared. The curve 328 shows the transfer function without the layer(s) 318 and when the section 317 is directly connected to ceramics, where this curve moves to 327 when the Cu layer is introduced. We note that the Cu layer removes the resonances in curve 325 and makes the transfer function 326 for connection into polymer fill and 328 for connection into ceramic of the LF section close to equal. This Figure hence demonstrates that introducing the Cu layer makes the HF electro-acoustic transfer function insensitive to whether the isolation section connects to polymer fill or ceramics in the layer 313. The dual band electro-acoustic transfer function can then typically take the form as in FIG. 3e where 331 shows the transfer function for the LF port and 332 shows the transfer function for the HF port.

Figure 4:
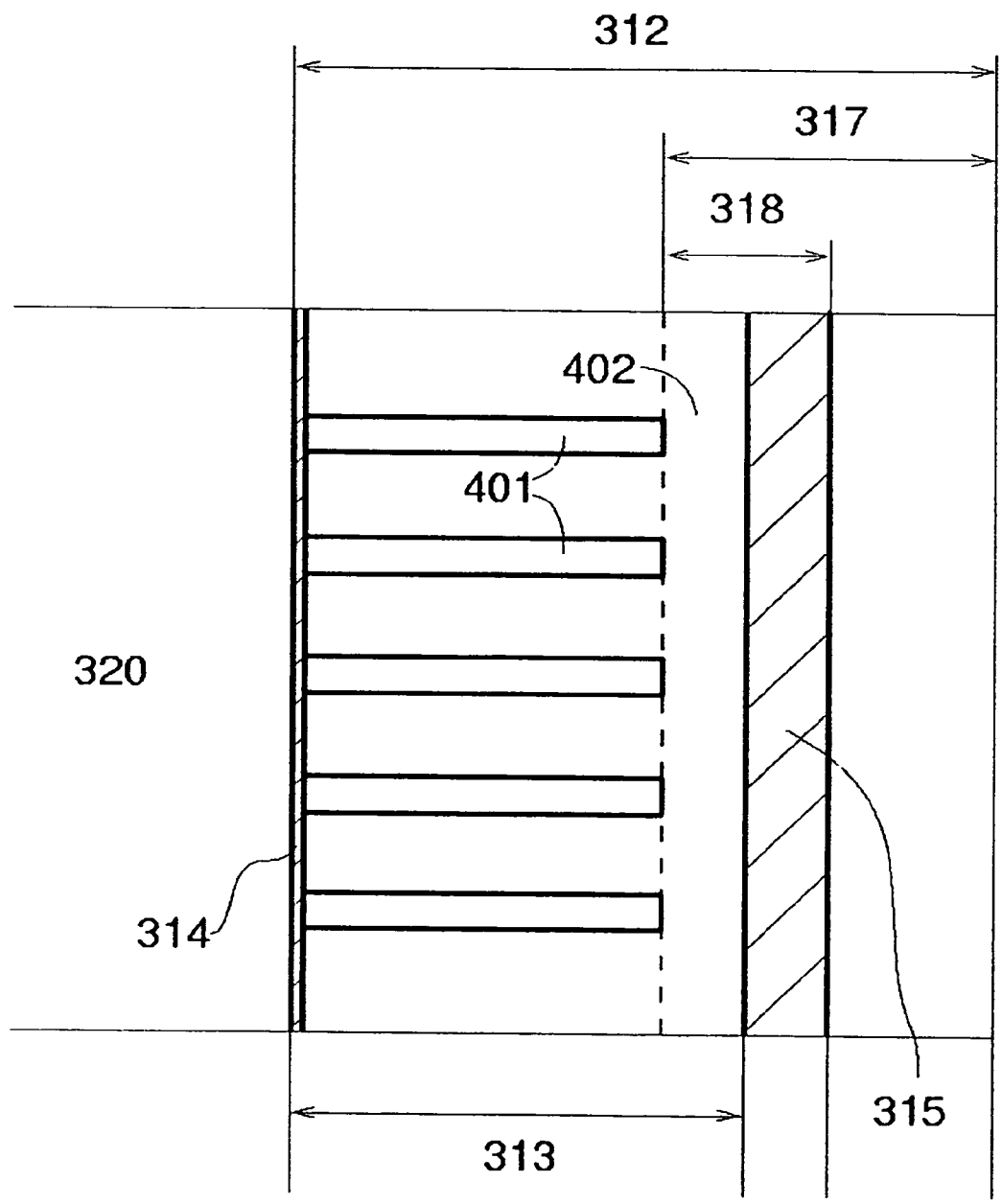
FIG. 4 shows an example of a partially cut LF piezolayer that participates in the isolation section between said HF and LF piezolayers according to the invention.

We should note that the important effect of this thin Cu layer is it's mass, i.e. $\rho L$ where p is the layer mass density and L is the layer thickness, that introduces an inductive impedance. The layer is therefore conveniently made of any heavy material, such as Cu, Ag, Au, Pd, Pt, and W, or alloys of these materials powders of these materials or alloys sintered together or glued in a solvent. The heaviest materials allows the thinnest layers, and as stated above the materials Ag, Au, Pd, and Pt have the lowest shear stiffness for their mass density and therefore produces the least lateral coupling between the LF elements. The layer 318 can also include part of the ceramics in layer 313 as illustrated in FIG. 4 where the labeling for the same layers follows that in FIG. 3a. The polymer filled cuts 401 in the LF piezolayer 313 are diced from the back of the layer but not diced completely through the LF ceramic layer 313 so that a complete ceramic layer 402 is left and included in the layer(s) 318 of the HF isolation section 317. The LF front electrode 315 can also be made so thick that it has an acoustic effect in the HF band and also can be included as part of the layer(s) 318.

FIG. 3a shows the thickness structure for a particular element of the array, where it is clear to anyone skilled in the art that the invention can be used to build ultrasound arrays of any organization, for example annular arrays, linear phased, linear switched arrays, or linear arrays with divisions in the elevation direction of many scales up to 2 D arrays for full 3 D steering of the beams. The dimensions of the LF elements are typically larger than the HF elements because the LF wavelength is larger which also favors the use of larger LF than HF transmit apertures as discussed above. For large depths, the HF receive aperture can also be larger than the LF transmit aperture, where in general one would favor a design with the same thickness structure throughout the whole array, and the size of the transmit receive apertures can be varied by selecting the elements that participates in the array.

Figure 5:
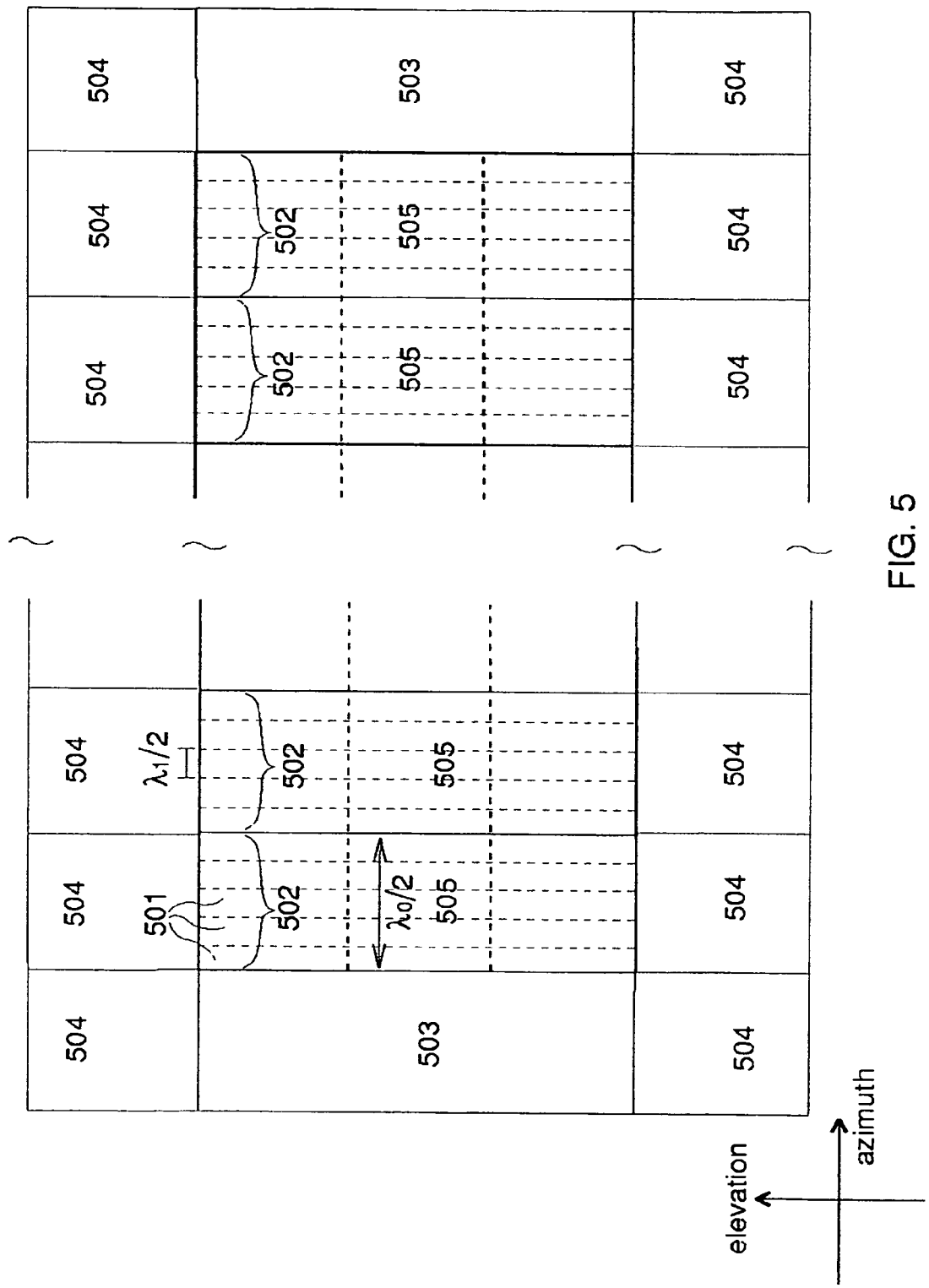
FIG. 5 shows a front view of a phased array probe according to the invention.

By example we show a typical linear phased array according to the invention, is shown in FIG. 5, where 501 indicates the elements of the phased array HF aperture. With proper steering of the signal on each element according to known methods, such an array allows steering of the beam direction within a sector in the azimuth direction. Steering in the elevation direction requires division of the elements also in the elevation direction into a two-dimensional (2 D) array, and we will at this point emphasize that the basic methods of the invention is also applicable to 2 D arrays.

The center of the HF band of this linear array is by example $f_1=3.5$ MHz which suggests a high frequency element pitch of $\lambda_1/2 \sim 0.22$ mm. 84 high frequency elements then produces a total aperture of 18.48 mm. With a center of the low frequency band of $f_0=0.5$ MHz we get $\lambda_0/2 \sim 1.54$ mm, which suggests 12 of the low frequency elements 502 that also produces a total aperture of 18.48 mm. For better collimation of the LF beam one could add extra LF elements to each side of the HF elements, where the Figure shows two elements 503 increasing the LF azimuth aperture to 14 elements ~21.56 mm. To increase the LF elevation aperture one could similarly expand the LF aperture by the elements 504 in the elevation direction. As follows from the analysis in relation to FIG. 2, one would like to use the same transmit aperture of the LF and HF radiation surfaces when it is critical that the phase between the HF and LF pulses has minimal sliding with depth, while for higher LF amplitude at large depths it can be desirable that the LF transmit aperture is larger than the HF transmit aperture to reduce diffraction broadening of the LF beam with depth. To reduce the nonlinear manipulation by the LF pulse in the propagation and scattering of the HF pulse close to the array, one would like to remove the central radiation surface of the array. This can be obtained by further dividing the LF elements into the sub elements 505. The LF array in FIG. 5 then allows selection of the size of the LF aperture, for example one of 1) to be equal to the HF aperture, 2) to be larger than the HF aperture either in the azimuth and elevation directions separately or in both the azimuth and elevation direction, and 3) a LF aperture with an inactive area in the center of the HF aperture. We also point out that such variation of the LF aperture relative to the HF aperture is obtained with other array configurations, for example annular arrays, where anyone skilled in the art can apply the essentials of this invention to all array configurations. For many applications one would like to use 2) only, which is achieved by combining the elements 502/504/505 into a single LF element with elevation dimension equal to or larger than the HF aperture, and add extra LF elements in the azimuth direction (503/504) to obtain a LF aperture that is larger than the HF aperture in the azimuth direction.

To get the same vibration conditions for the LF elements over their whole area, one could typically use a stack like in FIG. 3 for the whole array area, and define the LF and HF elements by the element electrodes and cuts in the piezoceramic. It would also be advantageous to use ceramic/polymer composites for both HF and LF the piezoelectric layers, where the element dimensions could be defined by the electrodes alone. The HF radiation area could then for example be defined by a common ground electrode on the front side which would define the elevation width of the elements both through electrical coupling but also by defining the areas of the ferroelectric ceramic that is polarized to show piezoelectric properties. The azimuth width of the HF elements are then defined by the back side hot electrodes which can conveniently be extended to the edge of the assembly for electrical connection to the cable as the electro-acoustic coupling outside the ground electrode is low.

The high acoustic impedance layer or group of layers 318 in FIG. 3 then makes accurate position matching between cuts in the HF and LF piezolayers less critical, as the impedance seen into the section 317 from the front has little variation with termination into polymer or ceramic, as discussed in relation to FIG. 3b-d. This reduced sensitivity allows dicing of the LF layer with thicker saw than the HF layer, and also reduces requirements for accurate lateral positioning between the HF and LF layers.

Figure 6:
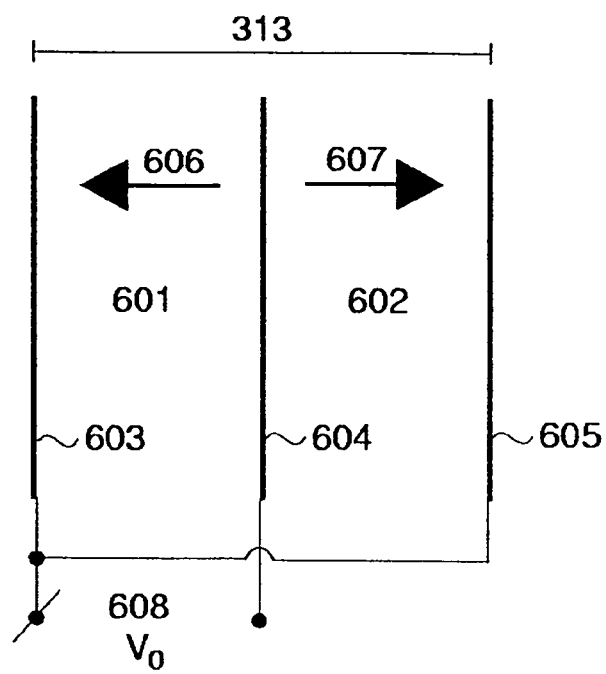
FIG. 6 shows an example of a dual piezolayer arrangement to reduce the electric impedance of array elements.

It is also known that the LF and HF piezolayers 313 and 304 can be made of multiple layers, both piezoelectric and non-piezoelectric to alter and increase the bandwidth of the electro/acoustic transfer functions and reduce the electric impedance of the electric ports. For example, to obtain lower electric impedance of the array elements, especially the low frequency elements to be able to transmit high pressures with manageable drive voltage amplitudes, one could conveniently make the low frequency piezo-section 313 as several piezo-layers covered with electrodes. FIG. 6 shows an example embodiment of two layers 601 and 602. The layers are covered with the electrodes 603, 604, and 605, where typically one would galvanically connect electrodes 603 and 605 to ground where the electrode 604 would be used as the hot electrode. The two piezo-layers would then have opposite polarization directions 606 and 607, so that the electrode coupling would provide an electrical parallel coupling of the layers 601 and 602 to provide a lower electric impedance port 608, which allows driving the low frequency array with lower voltages for the high pressures. Parallel coupling of more layers can be done for even lower electric port impedance, also for the high frequency layers, according to known methods. By using only one or a limited group of elements in the stack one can increase the bandwidth of the electro/acoustic transfer function.

Figure 7:
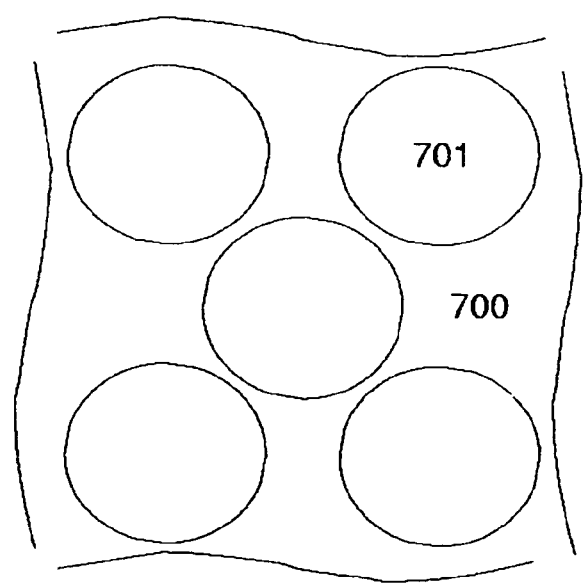
FIG. 7 shows a front view of a substrate with cmut/pmut micro-machined transduction cells.

It is also possible to base the electro-acoustic transduction on micro-machined transduction cells on the surface of a substrate, for example a Si (silicon) substrate, or other substrate of other materials such as Cu and Al. With these techniques, increased vibration of the surface is obtained by vibrating membranes on the substrate surface, with gas or vacuum behind the membrane, where the membrane connects to the acoustic load material either directly or through acoustic layers. The electromechanical coupling can either be obtained by capacitive coupling from the membrane to a reference electrode, referred to as cmuts (capacitive micromachined ultrasound transducers), or through piezoelectric films on the membranes, referred to as pmuts (piezolayer micromachined ultrasound transducers). Examples of such membranes are illustrated as 701 shown from the front radiation face in FIG. 7, mounted on the front surface of the substrate 700. The dimensions and thicknesses of the membranes determine the resonant band where the transduction is most efficient, and several of the cmut/pmut cells are usually coupled together electrically to form one array element. In the current invention we are concerned with inventive implementations of the cmut/pmut techniques to transmit the dual band pulses from at essentially the same radiating surfaces, where the Figures show inventive essentials of the invention to achieve the dual frequency function, and where details of the membranes, electrodes, and electrical connections are left out as many solutions for this are presented in the literature. We shall in the following refer to this technology as cmut/pmut transducers, cmut/pmut cells, and cmut/pmut membranes.

Figure 8:
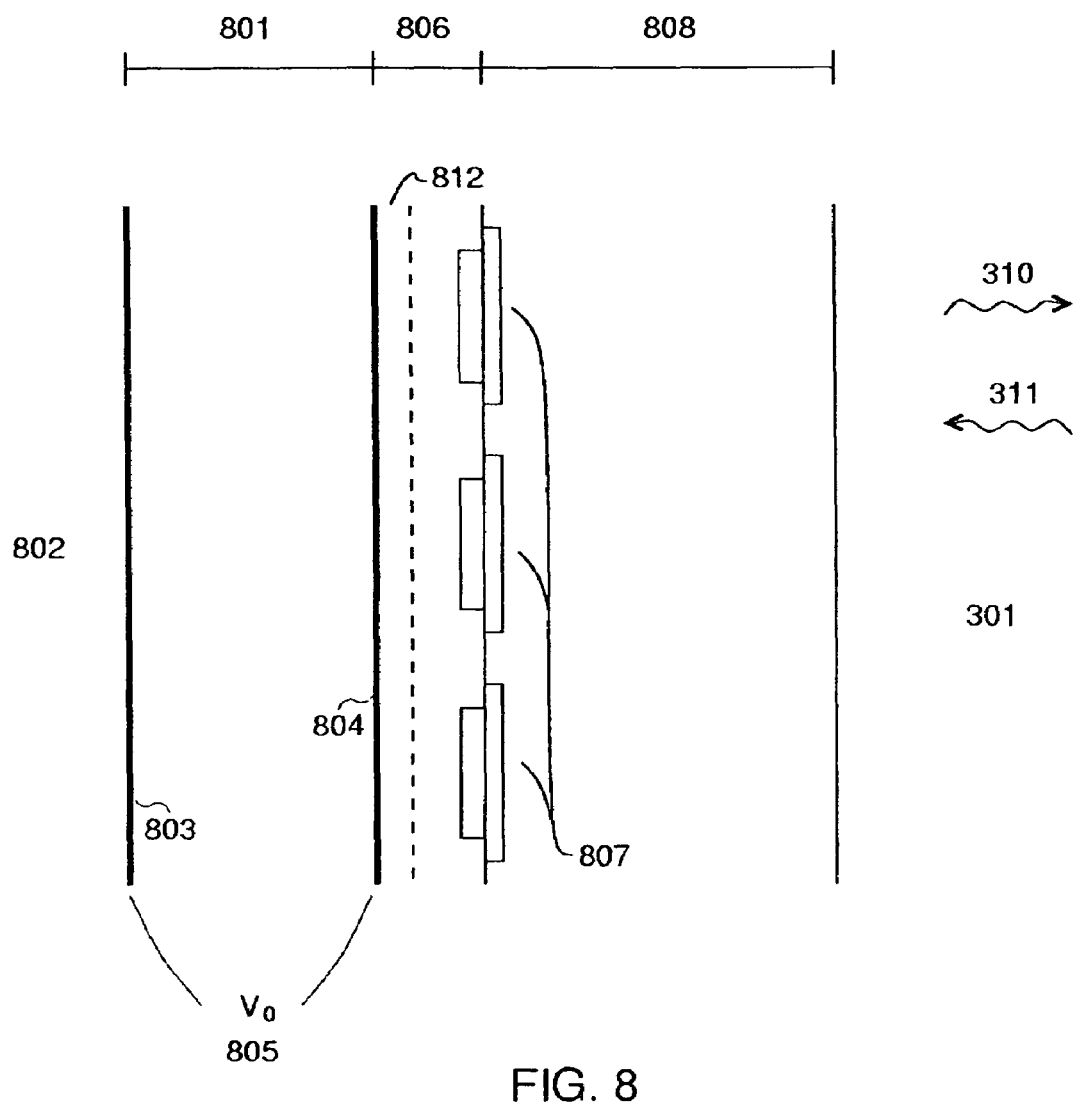
FIG. 8 shows a cross section of a transducer stack where the HF transduction is generated by cmut/pmut cells on a substrate in front of a piezolayer for LF transduction.

The characteristic impedance of Si is 19.6 MRayl, which gives and interesting possibility of transmitting the HF or the LF wave through a LF or HF substrate. By example FIG. 8 shows a cross section of a structure with a cmut/pmut HF section 806 mounted in front of a LF section made by a piezolayer 801 with electrodes 803 and 804 generating the LF element electric port 805. Details of the cmut/pmut drums with electrodes and electrical coupling is not shown as several examples exist in the literature per the discussion above. The total structure is in this example mounted on a backing material 802 (which can be low impedance or air) and a protection layer 808 is placed in front of the cmut/pmut drums 807. The Figure also shows an optional absorbing layer 812 to reduce lateral acoustic coupling in the Si substrate between the HF array elements and also between the substrate and the LF section in the HF frequency band. The drums 807 reduces the effective acoustic impedance of the layer 806 below that of Si, and by making the piezolayer 801 as a ceramic/polymer composite, the acoustic impedances of layer 801 and 806/808 can be matched for improved bandwidth of the LF port.

Figure 9:
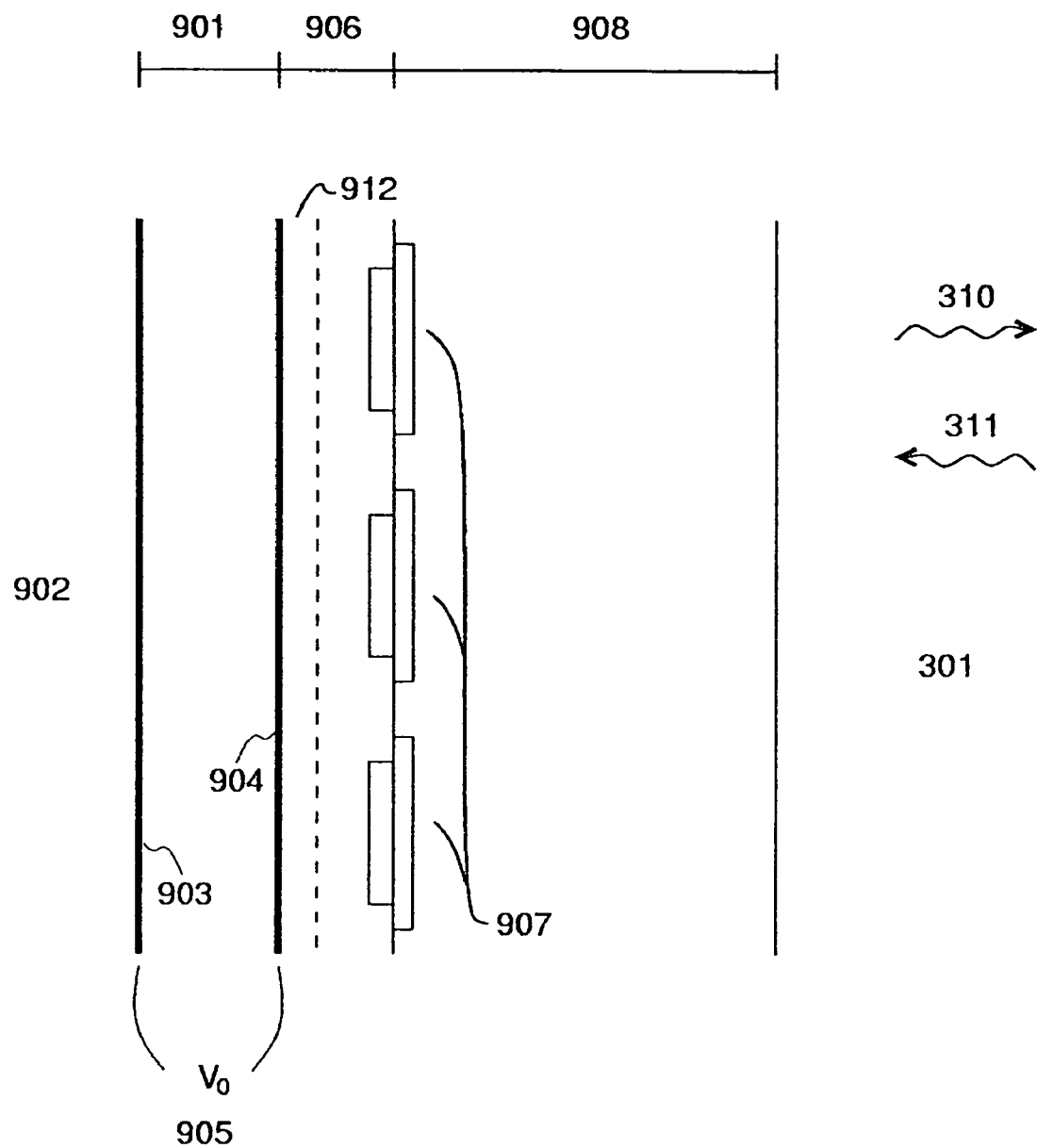
FIG. 9 shows a cross section of a transducer stack where the LF transduction is generated by cmut/pmut cells on a substrate in front of a piezolayer for HF transduction.

Another example in FIG. 9 shows a pmut/cmut LF section 906 in front of the HF piezolayer 901 made of ceramic/polymer composite mounted on a backing material 902. The element electrodes 903 and 904 constitute the HF element electric port 905. The LF transduction is provided by the cmut/pmut drums 907 on the substrate layer 906. Details of the cmut/pmut drums with electrodes and electrical coupling are not shown as several examples exist in the literature per the discussion above. By making the piezolayer 901 as a ceramic/polymer composite one can match the acoustic impedance of this layer to the effective acoustic impedance of the Si layer 906 with drums 907 to define the HF acoustic resonance. In front of this structure there are placed acoustic impedance matching layers (typically one or two) 908 that connect the HF and LF sections acoustically to the load material 301 for transmission (310) and reception (311) of dual band pulse waves in the load material. The acoustic matching section is together with the cmut/pmut layer 906 used to increase the bandwidth of the HF electro/acoustic transfer function, and will at the low frequency function as an acoustically thin protection cover layer for the LF array 906, where the stiffness of the cmut/pmut membranes is tuned to the acoustic layer/load transfer. Due to the high longitudinal wave velocity of Si (8.44 mm/μsec), the thickness of the Si substrate can be made adequately thin for acceptable effect on the HF electro/acoustic transfer function. To limit lateral coupling inside the Si substrate one can also use an optional absorbing isolation layer 912 at the back of the substrate, the isolation being made adequately thin at the high frequencies to have limited effect on the HF transfer function.

The layered structure in FIG. 9 has interesting advantages for 2 D arrays for three-dimensional (3 D) beam steering and imaging, where one have electrical access to the large number (~3000) of HF elements from the back of the array structure for simplest connection to cable or sub-aperture beam forming electronics. The LF 2 D array will have much fewer elements (1/50-1/100 of the HF number) simplifying the connection to the LF elements, where also simplified connection techniques are available with the cmut/pmut manufacturing technology.

Figure 10A:
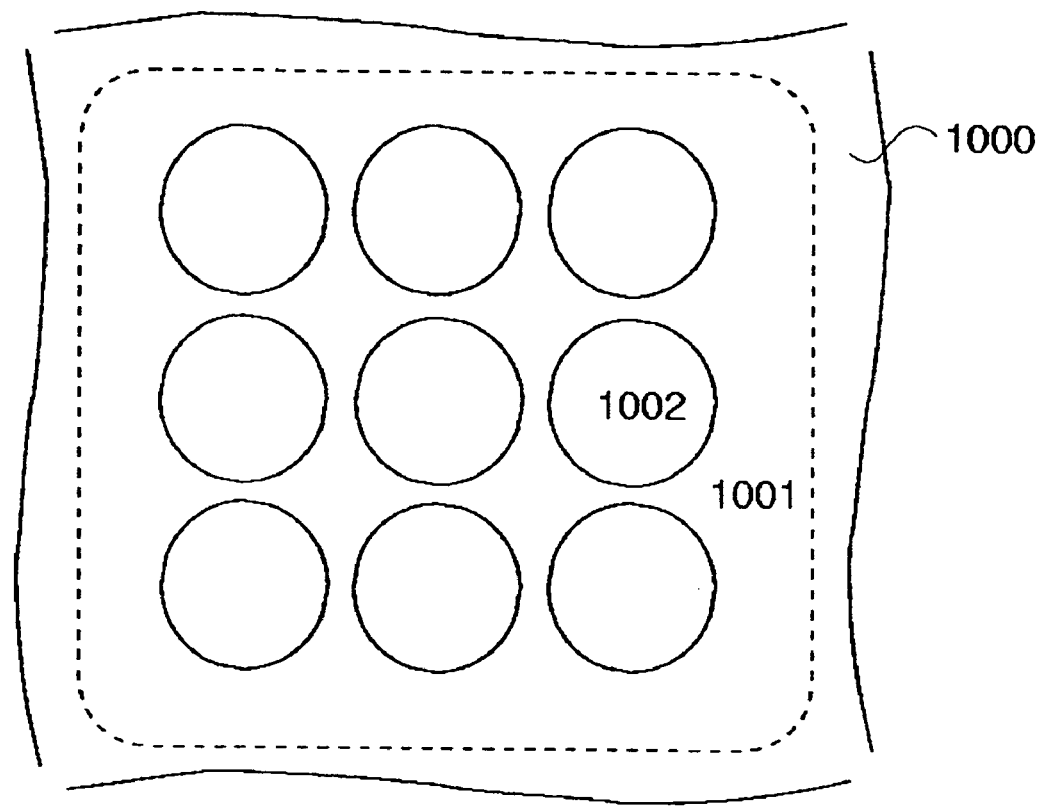
FIG. 10 shows a front and cross section view of a combined LF and HF section implemented by cmut/pmut transduction cells micro-machined on a substrate, where the HF cells are placed on top of the LF cells.
Figure 10B:
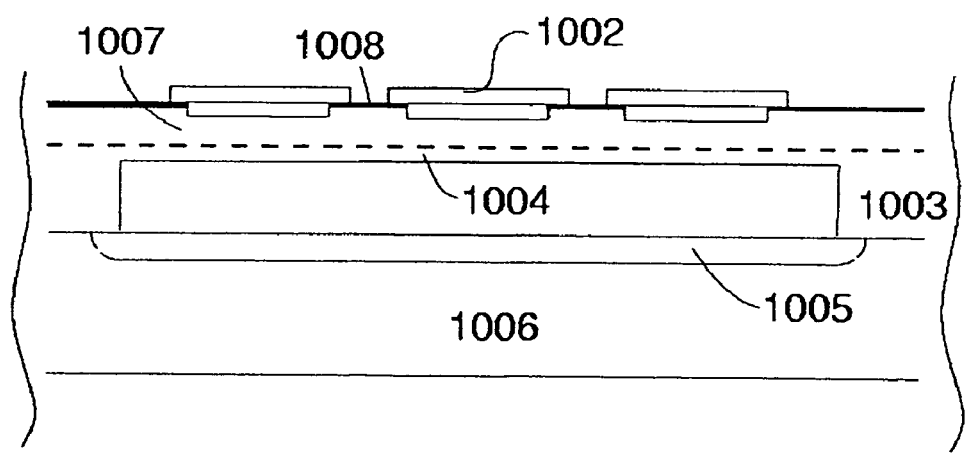

The invention also presents a solution to the LF/HF transduction with common radiation surface where high frequency cmut/pmut cells are mounted on top of low frequency cells, for example as illustrated in FIG. 10. FIG. 10*a* shows the substrate front 1000 with one low frequency cell 1001, and several high frequency cells 1002 on top of the low frequency cell. As the low frequency allows large dimensions of the low frequency cell, this cell might be micro-machined from the back side of the substrate as indicated in FIG. 10*b* which shows a cross section through the substrate 1003 where etching from the substrate back side provides the thin low frequency membrane 1004 in capacitive interaction with an electrode 1005 that is mounted on or part of a $2^{nd}$ substrate 1006 that is attached to the substrate 1003 through gluing or other bonding techniques. On the front of the low frequency membrane 1004 is micro-machined several high frequency cells 1002 from the front side of the substrate. With more complex manufacturing techniques, both the low and the high frequency cells can be manufactured from the front side. As for the other cmut/pmut solutions we have not shown details of the electrode arrangements and possible placement of piezoceramic elements, as several examples of such are given in the literature, and we in this description stress essential features of the design to be able to transmit both the LF and HF pulses from the same radiation surface. However, when Si is used as a substrate, the Figure indicates LF electrode solutions where a front layer 1007 of the Si-substrate is highly n-doped (n++) to provide a common ground electrode for the LF and HF cells. The hot LF electrode could similarly be obtained by high n-doping of a region 1005 of the $2^{nd}$ Si-substrate 1006.

Figure 11:
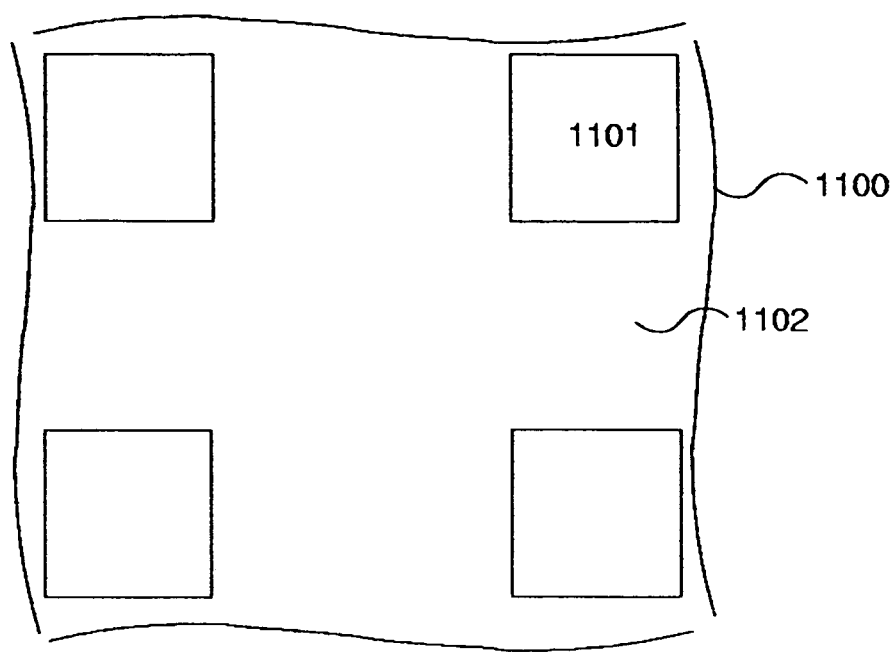
FIG. 11 shows a front view of a LF and HF array arranged as a sparse array where the HF and LF elements are placed between each other.

Dual frequency band operation with widely separated frequency bands can also conveniently be implemented as sparse arrays, where the low and the high frequency elements are placed at different locations on the array surface, but sufficiently close so that at outside a certain distance from the array, the two frequency beams appear to originate from at least partially the same radiating surface. 2 D sparse arrays are especially useful for 3 D ultrasound imaging where the sparse arrays allow two-dimensional direction steering of the ultrasound beam with a reduced number of elements (~1000). 2 D sparse arrays are also useful for corrections for wave front aberrations and pulse reverberations, both with 2 D and 3 D beam scanning. An example illustration is shown in FIG. 11 which shows a part of the array surface 1100 with four LF array elements 1101 with open space 1102 in between for placement of HF array elements in a sparse array pattern. Sparse arrays produce grating lobes in off-set directions from the beam main lobe, where the transmit and receive apertures must be designed for non-overlapping directions of the grating lobes. For imaging methods that are based on the nonlinear interaction between the dual frequency beams, for example as described in U.S. patent application Ser. Nos. 10/189,350 and 10/204,350, one gets improved suppression of the grating lobes in the image when the grating lobes for the LF and HF beams are non-overlapping. In fact, because of the large wavelength of the low band (λ~3 mm@ 500 kHz), it is possible to design an array with small low frequency array elements that do not have low frequency grating lobes but still with so large distance between the elements (~2 mm) that one can place many high frequency elements between the low frequency elements.

With resonant bulk piezo-ceramic elements for the electro-acoustic transduction similar to FIG. 3, one can with the sparse arrays for example manufacture a high frequency array with division of all its elements, and then select a subgroup of these element locations for the LF elements which are produced by attaching a piezo-ceramic slab at the back of said selected HF elements and do electrical connection between the front electrode of the high frequency element, which is commonly the ground electrode, and a back electrode of said attached piezo-ceramic slab. With less electro-acoustic transduction efficiency, one can reduce the resonance frequency for the LF elements by attaching a mass of a heavy and stiff material, for example metals like Cu, Ag, Au, Pd, Pt, or W at the back of the selected HF elements, and use the surface electrodes of the high frequency piezo-ceramic element for transduction.

Figure 12:
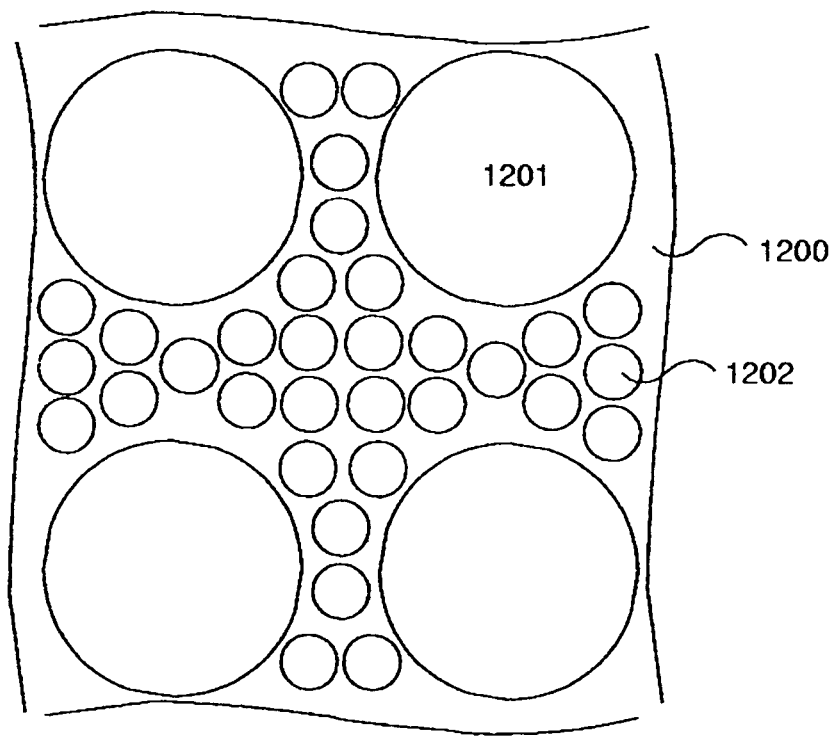
FIG. 12 shows a front view of a combined low and high frequency section implemented by cmut/pmut transduction cells micro-machined on a substrate, where the low and high frequency cells are placed side by side of each other.

Micro machined transduction elements on the front of a Si-substrate are also well suited for sparse array implementation of the dual frequency array, as the large low frequency cells and the smaller high frequency cells are machined at different locations on the array surface, as for example shown in FIG. 12, where 1201 shows cmut/pmut cells for the low frequency band on the substrate 1200, encircled by cmut/pmut cells 1202 for the high frequency band. High frequency band cells are electrically connected to form high frequency elements, while the low frequency band cells are connected to form larger low frequency elements, for example as illustrated for the phased array in FIG. 5. Typically several cells are electrically connected for each array element.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An ultrasound transducer array probe for transmission from a front of the probe of ultrasound pulses in separate low frequency (LF) and high frequency (HF) bands and reception of pulses in at least the HF band, the transducer comprising:
   radiation surfaces for the LF band and the HF band, wherein at least a portion of said radiation surfaces for the LF and HF bands are common in a common radiation surface,
   at least in a region of the common radiation surface, a stack of layers stacked in a thickness direction substantially normal to the common radiation surface, said stack including separate LF and HF piezoelectric layers configured for respective LF and HF electro acoustic transductions, wherein said HF piezoelectric layer is disposed closer to the common radiation surface than is said LF piezoelectric layer, and
   an acoustic isolation section composed of at least two acoustic layers stacked in the thickness direction and disposed between said HF and LF piezoelectric layers.

2. An ultrasound transducer array probe according to claim 1, wherein said isolation section includes a back layer with characteristic acoustic impedance greater than 17 MRayl and at least one layer with characteristic impedance less than 5 MRayl.

3. An ultrasound transducer array probe according to claim 2, wherein said back layer is made of one of the materials Cu, Ag, Au, Pd, Pt, W, or alloys of these materials, or powders of the one of the materials Cu, Ag, Au, Pd, Pt, W, or alloys of these materials, the powders being sintered or glued together.

4. An ultrasound transducer array probe according to claim 1, wherein a back layer of said isolation section comprises a ceramic layer.

5. An ultrasound transducer array probe according to claim 4, wherein said LF piezoelectric layer is made from a material comprising a ceramic/polymer composite wherein the ceramic/polymer composite is diced from the back and not fully through said LF piezoelectric layer, so that a front portion of said LF ceramic piezoelectric layer forms a laterally continuous layer that forms said back layer of said isolation section.

6. An ultrasound transducer array probe according to claim 5, wherein a $2^{nd}$ layer from the back of said isolation section is made of one of the materials Cu, Ag, Au, Pd, Pt, W, or alloys of these materials, or powders of the one of the materials Cu, Ag, Au, Pd, Pt, W, or alloys of these materials, the powders being sintered or glued together.

7. An ultrasound transducer array probe according to claim 1, wherein said stack includes a plurality of transducer elements, and said radiation surfaces include an LF transmit surface, an HF transmit surface, and at least one of an LF receive surface and an HF receive surface, wherein at least one of said radiation surfaces is made as a sparse array of said transducer elements, and where potential grating lobes of HF and LF transmit apertures of the probe do not overlap in space.

8. An ultrasound instrument utilizing an ultrasound probe according to claim 1, wherein a thickness of the stack is the same throughout the entire common radiation surface, and sizes of LF and HF transmit and receive apertures are selected electrically by the electrical connection to array elements in said stack.

9. An ultrasound instrument utilizing an ultrasound probe according to claim 8, wherein an active LF transmit aperture is selected one of
   a) automatically by the instrument depending on an image range, an ultrasound imaging modality and an application, and
   b) directly by the instrument operator through instrument controls.

10. An ultrasound transducer array probe according to claim 1, further comprising:
    a backing material on which said stack is mounted, and
    an acoustic matching section for the HF band placed in front of said HF piezoelectric layer.

11. An ultrasound transducer array probe according to claim 1, wherein each of said acoustic layers extends continuously contiguous with at least one of said LF and HF piezoelectric layers.

12. An ultrasound transducer array probe for transmission from a front of the probe of ultrasound pulses in separate low frequency (LF) and high frequency (HF) bands and reception of pulses in at least the HF band, the transducer comprising:

radiation surfaces for the LF band and the HF band, wherein at least a portion of said radiation surfaces for the LF and HF bands are common in a common radiation surface, at least in a region of the common radiation surface, a stack of layers stacked in a thickness direction substantially normal to the common radiation surface portion, wherein said stack includes a piezoelectric layer configured for one of LF and HF electro acoustic transduction, and a substrate layer with cmut/pmut based transduction membranes on a front face configured for the other of LF and HF electro acoustic transduction, wherein the stack of layers includes an HF array with at least one HF array element and an LF array with at least one LF array element respectively in the region of the radiation surfaces for the LF band and HF band, each element of the at least one LF array element within the common radiation surface having a larger radiation surface than does each element of the at least one HF array element within the common radiation surface, and wherein said substrate layer based on cmut/pmut transduction membranes is placed to the front of said piezoelectric layer.

13. An ultrasound transducer array probe according to claim 12, wherein said LF electro acoustic transduction is obtained by said piezoelectric layer.

14. An ultrasound transducer array probe according to claim 12, wherein said HF electro acoustic transduction is obtained by said piezoelectric layer.

15. An ultrasound transducer array probe according to claim 12, wherein said stack includes a plurality of transducer elements, and said radiation surfaces include an LF transmit surface, an HF transmit surface, and at least one of an LF receive surface and an HF receive surface, wherein at least one of said radiation surfaces is made as a sparse array of said transducer elements, and wherein potential grating lobes of HF and LF transmit apertures of the probe do not overlap in space.

16. An ultrasound instrument utilizing an ultrasound probe according to claim 12, wherein a thickness of the stack is the same throughout the entire common radiation surface, and sizes of LF and HF transmit and receive apertures are selected electrically by the electrical connection to array elements in said stack.

17. An ultrasound instrument utilizing an ultrasound probe according to claim 16, wherein an active LF transmit aperture is selected one of
a) automatically by the instrument depending on an image range, an ultrasound imaging modality and an application, and
b) directly by the instrument operator through instrument controls.

18. An ultrasound transducer array probe for transmission from a front of the probe of ultrasound pulses in separate low frequency (LF) and high frequency (HF) bands and reception of pulses in at least the HF band, the transducer comprising:

radiation surfaces for the LF band and the HF band, wherein at least a portion of said radiation surfaces for the LF and HF bands are common in a common radiation surface, a substrate, wherein at least in a region of the common radiation surface, separate cmut/pmut based LF and HF transduction membranes comprising at least one LF transduction membrane and at least one HF transduction membrane are arranged on said substrate and configured for respective LF and HF electro acoustic transductions, and wherein said LF and HF transduction membranes form an HF array having at least one HF array element and an LF array having at least one LF element within the common radiation surface, each element of the at least one LF array element within the common radiation surface having a larger radiation surface than does each element the at least one HF array element within the common radiation surface.

19. An ultrasound transducer array probe according to claim 18, wherein within said common radiation surface the at least one HF transduction membrane is placed in front of the at least one LF transduction membrane.

20. An ultrasound transducer array probe according to claim 18, wherein within said common radiation surface the at least one HF transduction membrane is placed side by side of the at least one LF transduction membrane, at a distance from each other such that LF and HF beams appear to originate from overlapping elements.

21. An ultrasound transducer array probe according to claim 18, wherein said radiation surfaces include an LF transmit surface, an HF transmit surface, and at least one of an LF receive surface and an HF receive surface, wherein at least one of said radiation surfaces is made as a sparse array of the LF array elements or the HF array elements, and wherein potential grating lobes of HF and LF transmit apertures of the probe do not overlap in space.

22. An ultrasound instrument utilizing an ultrasound probe according to claim 18, wherein a thickness of the substrate is the same throughout the entire common radiation surface, and sizes of LF and HF transmit and receive apertures are selected electrically by the electrical connection to array elements in said substrate.

23. An ultrasound instrument utilizing an ultrasound probe according to claim 22, wherein an active LF transmit aperture is selected one of
a) automatically by the instrument depending on an image range, an ultrasound imaging modality and an application, and
b) directly by the instrument operator through instrument controls.

24. An ultrasound transducer array probe for transmission from a front of said probe of ultrasound pulses in separate low frequency (LF) and high frequency (HF) bands and reception of pulses at least in the HF band, the transducer comprising:

different arrays of transducer elements configured for respective LF and HF electro-acoustic transduction, the array for the LF electro-acoustic transduction having at least one LF array element and the array for the HF electro-acoustic transduction having at least one HF array element, and radiation surfaces for the LF band and the HF band, wherein at least a portion of said radiation surfaces for the LF and HF bands are common in a common radiation surface, wherein each element of the at least one LF array element within the common radiation surface has a larger radiation surface than does each element of the at least one HF array element within the common radiation surface, and wherein the radiation surfaces include at least an LF transmit surface for LF band transmission and an HF transmit surface for HF band transmission, the outer boundaries of said LF transmit surface being at least in a region outside the outer boundaries of said HF transmit surface.

25. An ultrasound transducer array probe according to claim 24, wherein said array for the LF electro-acoustic transduction and said array for the HF electro-acoustic transduction are each arranged as one of
- a single element array,
- an annular array of transducer elements,
- a linear array of transducer elements, and
- a two dimensional array of transducer elements.

26. An ultrasound instrument utilizing an ultrasound probe according to claim 24, wherein
- a thickness of the structure of the different arrays is the same throughout the entire common radiation surface, and sizes of LF and HF transmit and receive apertures are selected electrically by the electrical connection to the transducer elements, and wherein
- active LF and HF transmit apertures are selected one of
- a) automatically by the instrument depending on an image range, an ultrasound imaging modality and an application, and
- b) directly by the instrument operator through instrument controls.

27. An ultrasound transducer array probe according to claim 24, wherein the radiation surfaces also include an HF receive surface for HF band reception, and the transducer elements are selectively activatable so that the HF receive surface is larger than the LF transmit surface.

28. An ultrasound transducer array probe for transmission from a front of said probe of ultrasound pulses in separate low frequency (LF) and high frequency (HF) bands and reception of pulses in at least the HF band, the transducer comprising:
- different arrays of transducer elements configured for respective LF and HF electro-acoustic transduction, the array for the LF electro-acoustic transduction having at least one LF array element and the array for the HF electro-acoustic transduction having at least one HF array element, and
- radiation surfaces for the LF band and the HF band, wherein at least a portion of said radiation surfaces for the LF and HF bands are common in a common radiation surface,
- wherein each element of the at least one the LF array element within the common radiation surface has a larger radiation surface than does each element of the at least one HF array element within the common radiation surface, and
- wherein the radiation surfaces include at least an LF transmit surface for LF band transmission and an HF transmit surface for HF band transmission, said LF transmit surface being not common with the HF transmit surface in a region around the center of said HF transmit surface.

29. An ultrasound transducer array probe according to claim 28, wherein said array for the LF electro-acoustic transduction and said array for the HF electro-acoustic transduction are each arranged as one of
- a single element array,
- an annular array of transducer elements,
- a linear array of transducer elements, and
- a two dimensional array of transducer elements.

30. An ultrasound instrument utilizing an ultrasound probe according to claim 28, wherein
- a thickness of the structure of the different arrays is the same throughout the entire common radiation surface, and sizes of LF and HF transmit and receive apertures are selected electrically by the electrical connection to the transducer elements, and wherein
- active LF and HF transmit apertures are selected one of
- a) automatically by the instrument depending on an image range, an ultrasound imaging modality and an application, and
- b) directly by the instrument operator through instrument controls.

31. An ultrasound transducer array probe according to claim 28, wherein the radiation surfaces also include an HF receive surface for HF band reception, and the transducer elements are selectively activatable so that the HF receive surface is larger than the LF transmit surface.

32. An ultrasound transducer array probe for transmission from a front of said probe of ultrasound pulses in separate low frequency (LF) and high frequency (HF) band and reception of pulses in at least the HF band, the transducer comprising:
- radiation surfaces for the LF band and the HF band including at least an LF transmit surface for LF band transmission and an HF transmit surface for HF band transmission, wherein at least a portion of said radiation surfaces for the LF and HF bands are common in a common radiation surface,
- LF array elements and HF array elements, at least said LF array elements being selectively activatable so that the size of the LF transmit surface can be selectively varied to be one of
- a) equal to the HF transmit surface,
- b) at least in a region outside the HF transmit surface,
- c) in a central region of said HF transmit surface at which there is no active LF transmit surface, and
- d) a combination of b) and c), and wherein
- the LF array elements within the common radiation surface have larger radiation surfaces with a larger distance between neighboring element centers, than do the HF array elements within the common radiation surface.

33. An ultrasound instrument utilizing an ultrasound probe according to claim 32, wherein an active LF transmit aperture is selected one of
- a) automatically by the instrument depending on an image range, an ultrasound imaging modality and an application, and
- b) directly by the instrument operator through instrument controls.

* * * * *